United States Patent [19]
Scag

[11] Patent Number: 4,885,903
[45] Date of Patent: Dec. 12, 1989

[54] SAFETY INTERLOCK FOR LAWN MOWERS

[76] Inventor: Dane T. Scag, Box 152, Mayville, Wis. 53050

[21] Appl. No.: 224,925

[22] Filed: Jul. 27, 1988

[51] Int. Cl.⁴ ............................................. A01D 69/00
[52] U.S. Cl. .......................................... 56/10.8; 56/11.3
[58] Field of Search ............... 56/10.2, DIG. 15, 10.8, 56/11.8, 11.3, 10.5

[56] References Cited

U.S. PATENT DOCUMENTS

| | | | |
|---|---|---|---|
| 3,942,604 | 3/1976 | Black, III | 56/10.5 |
| 3,969,875 | 7/1976 | Nofel | 56/10.2 |
| 4,062,135 | 12/1977 | Dobberpuhl | 56/10.8 |
| 4,476,643 | 10/1984 | Hilchey et al. | 37/245 |
| 4,667,459 | 5/1987 | Scauland et al. | 56/10.8 |
| 4,704,847 | 11/1987 | Greider et al. | 56/11.3 |

*Primary Examiner*—John Weiss
*Attorney, Agent, or Firm*—Fred Wiviott

[57] ABSTRACT

A lawn mower has an engine coupled by a transmission to drive wheels and by a belt drive to cutter blades. A cutter blade clutch lever is coupled to the belt drive and a shift lever is coupled to the transmission for respectively shifting the transmission and belt drive between neutral and drive positions. Safety interlock levers are mounted adjacent the lawn mower handles and each has a hand grip which is arcuate in cross section and engageable with and complementary to the mower handle hand grips. Each safety interlock hand grip is mounted on a control rod which is pivotable from a first position to a second position wherein the hand grips are located beneath and nestled against the mower handle hand grips. The shift lever, cutter blade clutch lever and safety interlock levers are all interconnected with the engine ignition system in such a manner that if the safety interlock levers are released when the shift lever and/or the clutch lever are in their drive positions, the ignition system will be short-circuited so that the engine will be stopped.

5 Claims, 2 Drawing Sheets

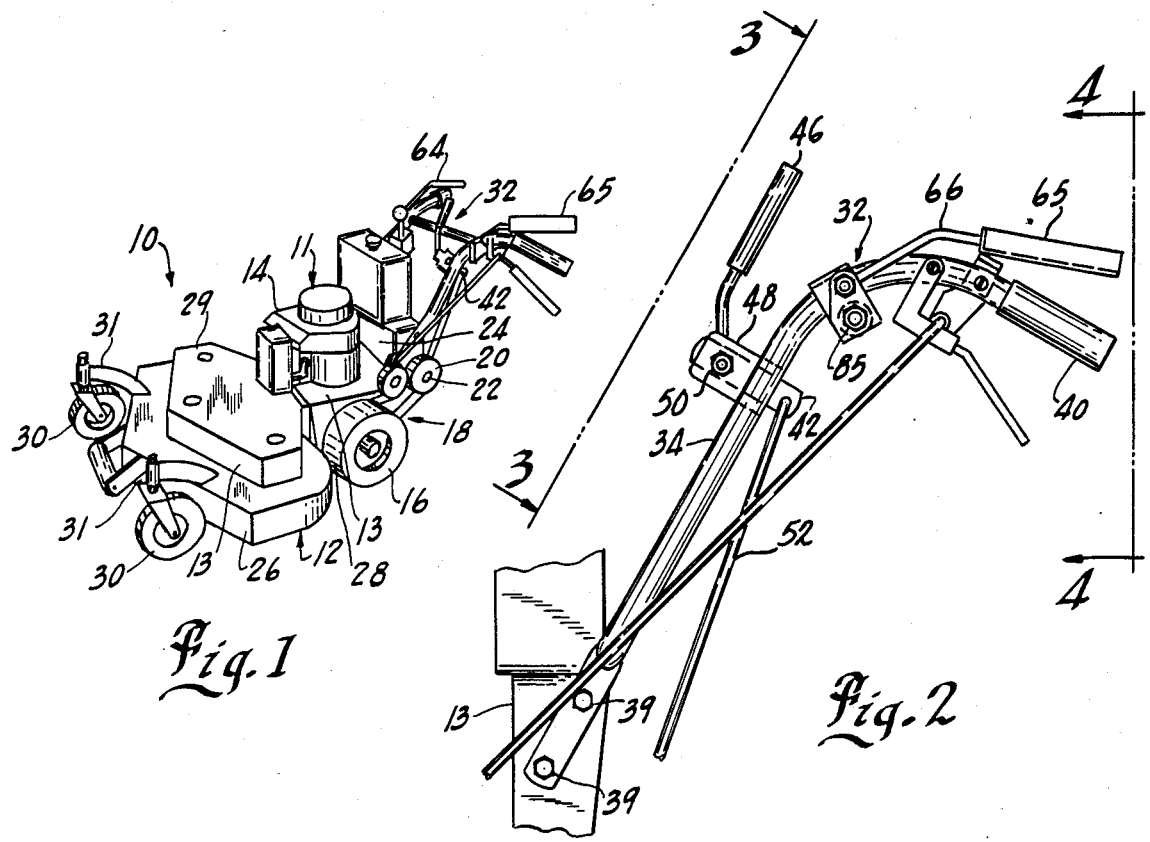
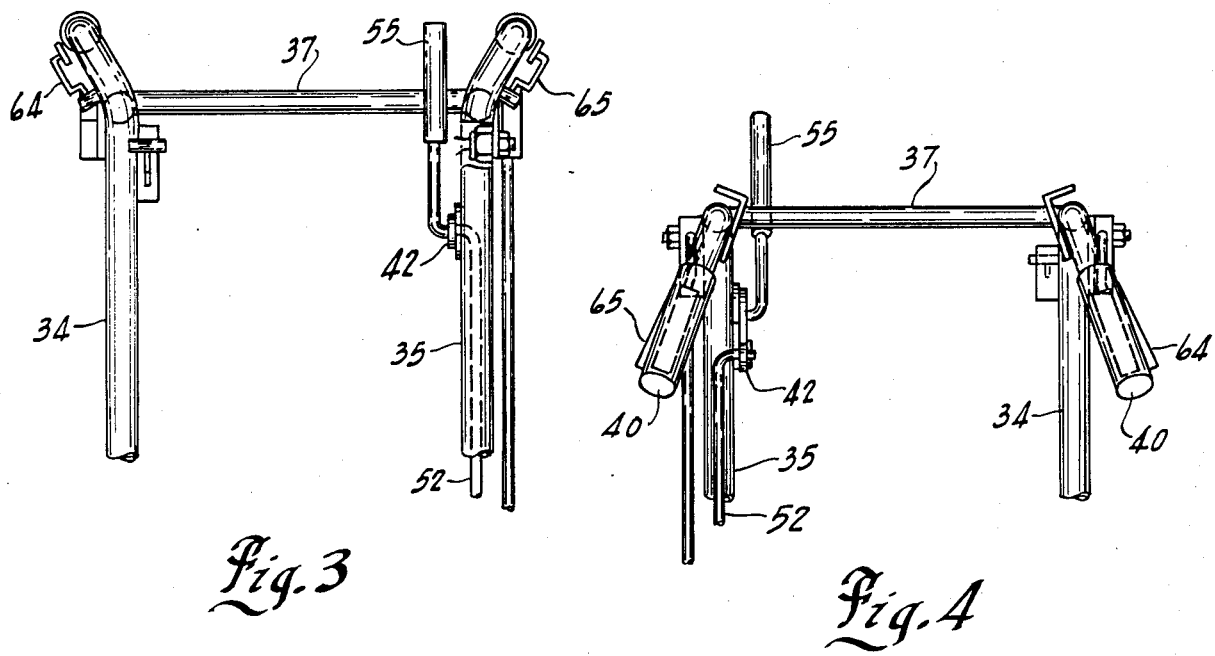

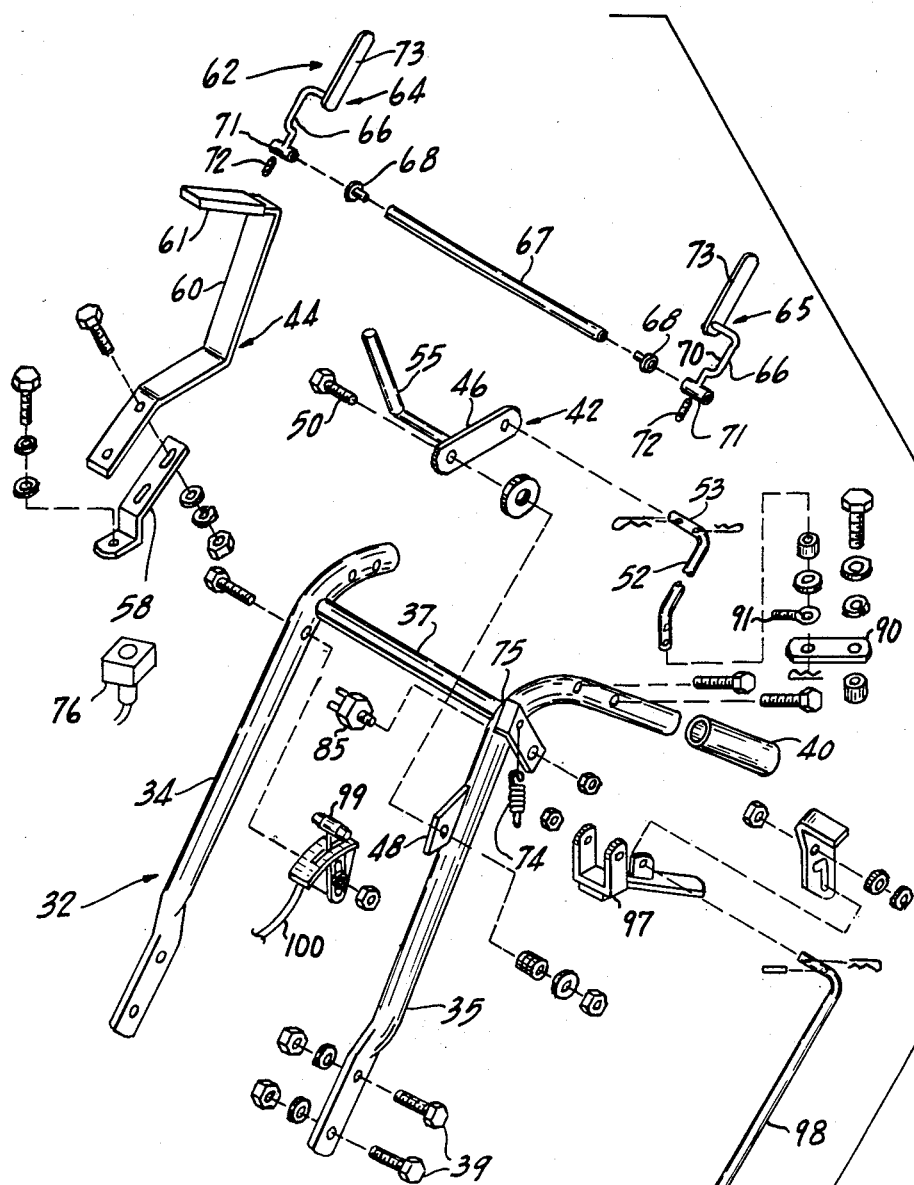
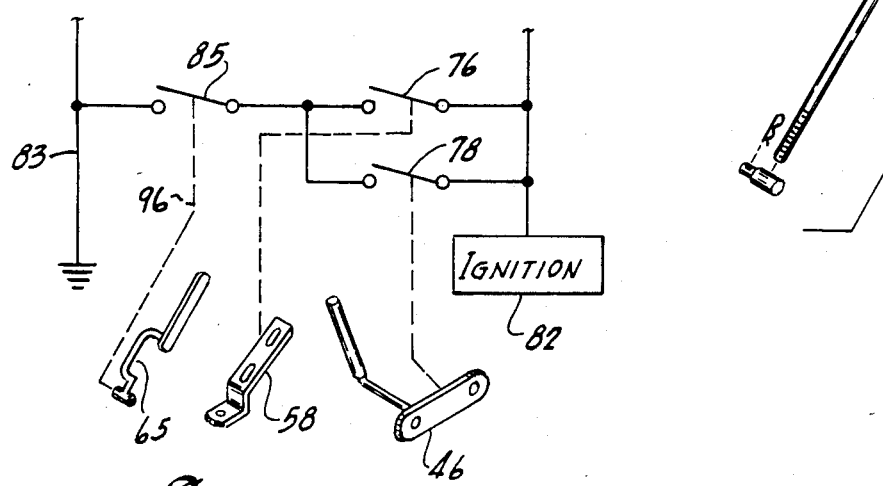
Fig. 5
Fig. 6

SAFETY INTERLOCK FOR LAWN MOWERS

BACKGROUND OF THE INVENTION

This invention relates to lawn mowers and safety interlock systems for power lawn mowers in particular.

Safety regulations require that power lawn mowers have safety interlock systems which cause the engine to be stopped if the operator releases the mower hand grips without disengaging the drive wheels and the cutter blade from the engine. Conventional safety interlock systems generally include a lever or bar located on the upper portion of the operating handle which must be pivoted downwardly into engagement and held against the handle grips before the drive wheels and cutter blades can be coupled to the engine. In practice, prior art safety interlock systems tend to cause operator hand fatigue and irritation when operated for long periods of time, such as in the case of commercial lawn mowers. As a result, it is not uncommon for operators to either remove the safety interlock system or to tape the interlock lever or bar against the mower hand grips. While this tends to relieve hand irritation and fatigue, operator safety is jeopardized.

SUMMARY OF THE INVENTION

It is an object of the invention to provide a new and improved safety interlock system for power lawn mowers.

A further object of the invention is to provide a safety interlock system for power lawn mowers which does not cause operator hand fatigue or irritation when operated for long periods of time.

These and other objects and advantages of the present invention will become more apparent from the detailed description thereof taken with the accompanying drawings.

In general terms, the invention comprises an improvement for lawnmowers having an engine for driving at least a cutter blade or both a cutter blade and drive wheels, first and second clutch means for coupling and disengaging the cutter blade and drive wheels respectively to and from said engine, safety interlock means operable in a first position to maintain the engine in operation and in a second position to deactivate the engine when the cutter blade or drive wheels are coupled to the engine, and handle means for manipulating the lawn mower. The invention comprises the improvement wherein the safety interlock means includes means pivotally mounted adjacent the handle means for movement between first and second protions and includes hand grip means having a surface in engagement with or in proximity to the outer surface of the handle means when the safety interlock means is in its first position whereby the safety interlock means and handle feels like a unitary member to an operator. According to a more specific aspect of the invention there are a pair of handle means each having a generally tubular configuration and the hand grip means surface is formed on one side thereof, the other side thereof being arcuate in cross section and may conform generally to the outer surface of the adjacent portion of the handle means. According to yet another aspect of the invention, the hand grip means of the safety interlock means engages or is proximate to the handle means along the lower outer side thereof when in its first position.

BRIEF DESCRIPTION OF THE DRAWINGS

FIG. 1 is a perspective view of the lawn mower in accordance with the preferred embodiment of the invention;

FIG. 2 is a side view showing the handle and control portion of a lawn mower illustrated in FIG. 1;

FIG. 3 is a view taken along lines 3—3 of FIG. 2;

FIG. 4 is a view taken along lines 4—4 of FIG. 2;

FIG. 5 is a perspective exploded view of the handle and control portion shown in FIG. 2; and FIG. 6 schematically illustrates the interaction between the lawn mower controls and the ignition system.

DETAILED DESCRIPTION OF THE PREFERRED EMBODIMENT

The power lawn mower 10 illustrated in FIG. 1 includes a drive assembly 11 and a cutter assembly 12. The drive assembly 11 includes a frame 13 for supporting a conventional gasoline engine 14. A pair of rear drive wheels 16 are mounted on frame 13 and generally below the engine 14. Power is transferred from the engine 14 to the rear wheels 16 by means of a belt drive assembly 18 which is conventional and, accordingly, will not be described in detail. It will be sufficient for purposes of understanding the invention to note that the drive 18 includes a drive pulley 20 mounted on jack shaft 22 extending from a transmission 24 mounted on frame 13 behind engine 14. As those skilled in the art will appreciate, the engine drive shaft (not shown) is coupled to the transmission 24 in any suitable manner, such as by a belt drive (not shown) and a clutch (not shown).

The cutter assembly 12 is also conventional and will not be disclosed in detail for the sake of brevity. In general terms, however, the cutter assembly 12 includes a cutter deck 26 suitably mounted at the front of frame 13 by brackets 28. Mounted below the cutter deck 26 is one or more cutter blades (not shown) which rotate in a horizontal plane on vertical shafts (not shown) which are coupled to the engine 14 by a third belt drive (not shown) but which is mounted beneath a cover 29. The cutter blade or blades and the associated belt drive are conventional as are the transmission 24 and the rear wheel drive. Accordingly, these parts will not be shown in detail for the sake of brevity.

A second pair of wheels 30 are mounted at the front of the cutter deck 26 by means of caster assemblies 31 which permit the mower to be steered by a handle assembly 32 mounted at the rear of frame 13. The handle assembly 32 consists of a pair of handle members 34 and 35 and a cross member 37 which is secured adjacent the upper end of handle members 34 and 35 to hold the same in a spaced apart parallel relation. Each handle member is also fixed to the frame 13 by bolts 39 and extend upwardly and rearwardly therefrom and each has a downward curve at its remote end for receiving a hand grip member 40. It will be appreciated that the operator controls the motion of the mower through the agency of the hand grips 40.

Mounted at one side of handle member 35 is a blade clutch lever assembly 42 and a drive shift lever assembly 44 is mounted on handle member 34. The blade clutch assembly includes a blade clutch lever 46 pivotally mounted adjacent one end by means of a bolt 50 on a bracket 48 extending integrally forward from handle member 35. In particular, a bolt 50 extends through aligned openings adjacent one end of the blade clutch lever 46 and in the bracket 48. An elongate blade clutch rod 52 is bent inwardly at one end 53 for being received in a second opening which is in the other end of the blade clutch lever 46. Affixed to blade clutch lever 46 and extending from one side thereof is a generally L-shaped grip lever 55. The other end of the blade clutch rod 52 is coupled to a blade clutch linkage (not shown) which is operable to move an idler pulley (not shown) into and out of engagement with the blade clutch belt drive (not shown) so that pivotal movement of the grip lever 55 in one direction will cause engagement of the blade clutch (not shown) whereby the cutter blades (not shown) will be rotated while pivotal movement of the grip lever 55 in the opposite direction will disengage the blade clutch (not shown) so that rotation of the cutter blade will cease.

The shift lever assembly 44 includes a shaped shift lever 58 coupled at its lower end to the rear wheel transmission drive assembly (not shown). The upper end of the shift lever 58 is coupled to a shift lever extension 60 having a hand grip 61 at its upper end. As those skilled in the art will appreciate, movement of the shift lever 58 in one direction will shift the transmission from neutral to couple the engine 14 to the rear wheels 16. Conversely, movement of the shift lever 58 in the opposite direction will return the transmission to neutral thereby disengaging the rear wheels 16 from the engine 14.

The lawn mower described above is conventional and accordingly has not been described in detail nor has all of the conventional details been illustrated. In addition, conventional lawn mowers also include safety interlocks which cause the engine to be stopped unless either the drive wheels and cutter blade are disengaged from the engine or a safety interlock lever be gripped by the operator. The instant invention comprises a specific safety interlock 62 which will now be described.

The safety interlock assembly 62 in accordance with the preferred embodiment of the invention includes a pair of safety interlock levers 64 and 65 mounted at the opposite ends of a pivot control rod 67 which extends through the handle cross member 37. Suitable bushings 68 support the pivot control rod 67 for rotation about its axis within member 37. Each lever 64 and 65 has an angled rod 66 secured at one end to a member 71 which is fixed to the end of control rod 67 by set screw 72. In particular, each rod 66 has an outward bend at its end adjacent cross member 70 and an inward bend at its opposite end which engages the hand grip 73 as shown in FIGS. 3 and 5. A hand grip 73 may be fixed to the free end of each rod 66 and extends longitudinally therefrom. The hand grips 73 may comprise relatively flat bars which may be pivoted downwardly from a remote position shown in FIG. 2 to position adjacent the grips 40 as shown in FIGS. 3 and 4. In addition, the rods 66 are shaped as shown in FIGS. 2 and 4 such that when they are pivoted downwardly the hand grips 73 move adjacent the lower outside portion of hand grips 40.

A small spring 74 is coupled to one interlock lever 65 and a bracket 75 on handle 35. When the grip levers 64 and 65 are pivoted so that they are adjacent the hand grips 40, the spring 74 is placed under tension. As a result, the spring 74 urges the safety interlock levers 64 and 65 from their positions shown in FIG. 4 wherein they are adjacent the hand grips 40 to their position shown in FIG. 2 wherein they are displaced upward from the hand grips 40. As a result, when the operator releases the safety interlock levers 64 and 65, they will move from their position shown in FIG. 4 to their position shown in FIG. 2.

FIG. 6 shows the lawn mower safety control system to include interlock switches 76 and 78 connected in parallel between the electrical ground 83 and the mower engine ignition system 84. A third switch 85 is connected in series with switches 76 and 78. Interlock switch 76 is mechanically coupled to the shift lever 58, the interlock switch 78 is mechanically coupled to the blade clutch lever 46 and the interlock switch 85 is coupled to the safety interlock lever 64, 65 or both. The levers 46 and 58 and the interlock levers 64 and 65 engage the switches 76, 78 and 85 in a conventional manner well known in the art. For example, lever 46 is connected to one end of the blade clutch rod 52 (FIG. 5). The other end of the clutch rod 53 is connected to a lever 90 which is also connected to the switch 78 in a conventional manner (not shown). The rod 52 is also coupled to an eye bolt 91 which in turn is coupled to the mowers clutch idler arm (not shown). The shift lever 58 is coupled to a conventional ignition switch 76 in a manner well known in the art. The interlock switch 85 is mounted on the lower end of the bracket 75 as shown in FIGS. 2 and 5. The end of rod 66 of interlock lever 65 pivots adjacent the upper end of bracket 75 and is coupled to switch 85 by a link 96 schematically illustrated in FIG. 6. The switches 76 and 78 are closed when the shift lever 58 and the blade clutch lever 46 are in their engaged positions and switches 76 and 78 are open when the shift lever 58 and the blade clutch lever 46 are in their neutral positions. Switch 85 is in its closed position when the safety interlock levers 64 and 65 are released so that they are remote from the hand grips 40 and switch 85 is open when the safety interlock levers are held by the operator in engagement with the hand grips 40. It can thus be seen that for the engine ignition system 82 to be energized, either both the shift lever 58 and the blade clutch lever 46 must be in their neutral positions, or the operator must retain the safety interlock hand grips 73 in engagement with the hand grips 40. This prevents the operator from leaving the mower unattended while the cutter blades or the drive wheels 16 are being driven.

Interlock lever 65 pivots adjacent the upper end of bracket 75 and is coupled to switch 85 by a link 96 schematically illustrated in FIG. 6. As shown in FIG. 5, a conventional brake hand grip 97 is pivotally mounted on handle member 35 and is connected by a control rod 98 to a brake (not shown) mounted on one of the mower's drive wheels 16. The brake is conventional and forms no part of the invention and, therefore, will not be discussed for the sake of brevity. A throttle control 99 is mounted on handle 34 and is connected to the engine throttle (not shown) by a cable 100 in a conventional manner.

The configuration of the safety interlock levers 64 and 65 permit the operator to grasp both hand grips 73 and 40 simultaneously with his fingertips as though they were a single member. As a result, the operator is relieved from tension and hand irritation which were common with safety interlock systems of prior art lawn mowers. In fact, the operator will be virtually unaware that he is gripping the safety interlock levers because the hand grips 62 and 40 will feel like a single member.

While only a single embodiment of the invention has been illustrated and described, it is not intended to be limited thereby but only by the scope of the appended claims. For example, while the interlock levers 64 and 65 are shown to be coupled to each other by the pivot control rod 67, they may be pivoted individually with each being mechanically coupled to the switch 85.

I claim:

1. In a lawn mower having an engine for driving a cutter blade and drive wheels, first and second clutch means for coupling and disengaging said cutter blade and drive wheels, respectively, to and from said engine, safety interlock means operable in a first position to maintain the engine in operation and in a second position to deactivate said engine when said cutter blade or drive wheels are coupled to the engine, a pair of spaced apart, generally elongate, individual handles mounted on said lawn mower and extending generally rearwardly and each having a surface adapted to be gripped by an operator for manipulating the lawn mower, each surface including an inner surface portion facing generally toward the other handle, an outer surface portion on the opposite side thereof and an upper surface portion, the improvement wherein the safety interlock means includes at least one lever pivotally mounted adjacent at least one of said handles for pivotal movement between said first and second positions and movable therewith, said hand grip being disposed, adjacent to the outer surface portion of the one handler and spaced from the upper surface portion thereof when said lever is in its first position, whereby said handle grip will fit comfortably in the palm of the operator's hand without stain as the hand grip means is maintained in its first position by the operator gripping the one handle.

2. The lawn mower set forth in claim 1 wherein there are a pair of interconnected safety interlock levers each having a hand grip, each of said hand grips disposed adjacent to and generally parallel with the outer surface portions of a different one of the handles when each hand grip is in its first position.

3. The lawn mower set forth in claim 2 wherein each of said hand grips comprises a relatively flat bar having a pair of side surfaces, one of said side surfaces being disposed adjacent one of the handles when the bar is in its first position, the width of said side surfaces being greater than the thickness of the bar.

4. The lawn mower set forth in claim 3 wherein there are a pair of safety interlock levers, each of said levers being pivotally mounted on said lawn mower forwardly of said handles, each of said bars extending rearwardly from said lever so that when each of said levers is pivoted downwardly into its first position, each of said bar means is disposed adjacent to and spaced from the outer surface portion of its respective handles.

5. The lawn mower set forth in claim 4 and including biasing means for returning such safety interlock levers to their second positions when released by the operator.

* * * * *

UNITED STATES PATENT AND TRADEMARK OFFICE
CERTIFICATE OF CORRECTION

PATENT NO. : 4,885,903
DATED : December 12, 1989
INVENTOR(S) : Dane T. Scag

It is certified that error appears in the above-identified patent and that said Letters Patent is hereby corrected as shown below:

Column 5, line 26, delete "handler" and substitute --handle--.

Column 5, line 28, delete "handle" and substitute --hand--.

Column 6, line 2, delete "stain" and substitute --strain--.

Column 6, line 7, after "grips" insert --being--.

Signed and Sealed this

Twelfth Day of November, 1991

Attest:

HARRY F. MANBECK, JR.

Attesting Officer

Commissioner of Patents and Trademarks